Jan. 7, 1930.    A. H. SIMMONS    1,743,073
TEMPERATURE CONTROL DEVICE
Filed Aug. 3, 1926    2 Sheets-Sheet 1
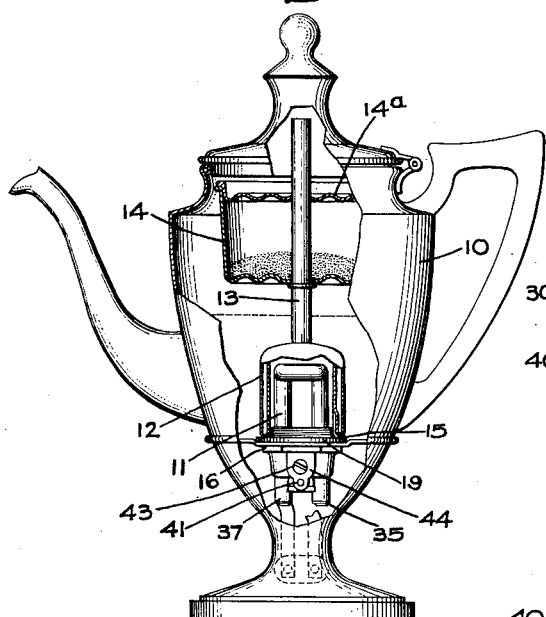
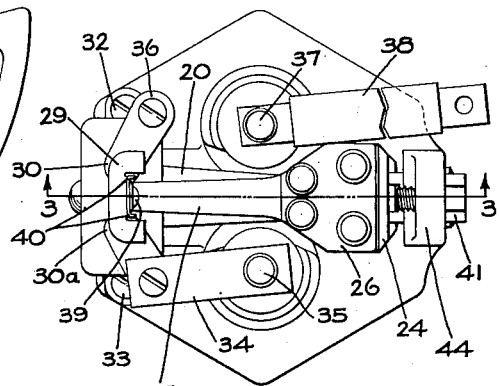
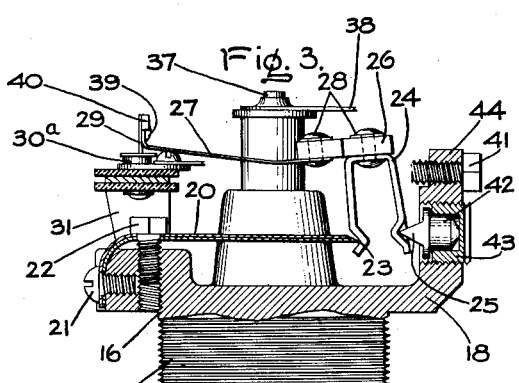
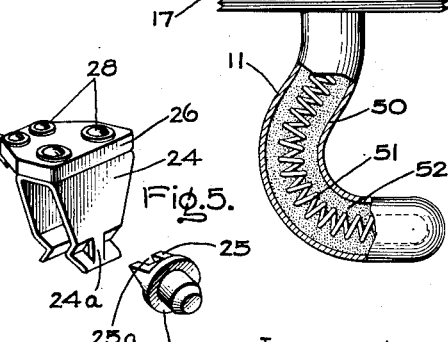
Inventor:
Albert H. Simmons,
by Alexander S. Lunt
His Attorney.

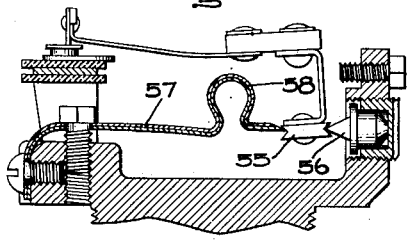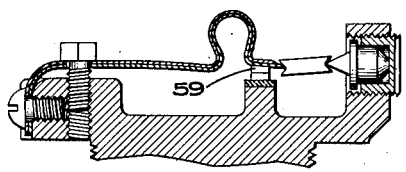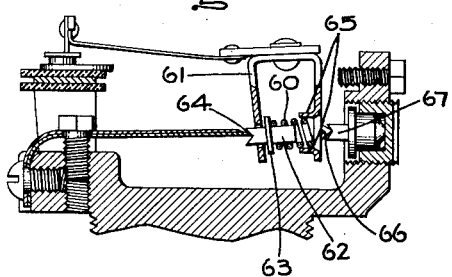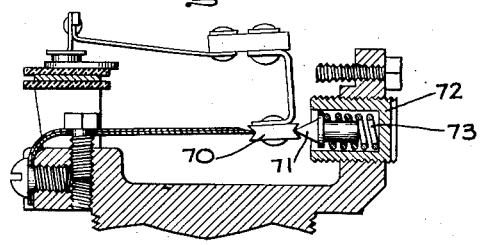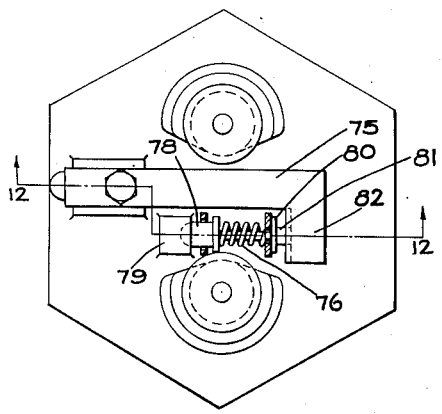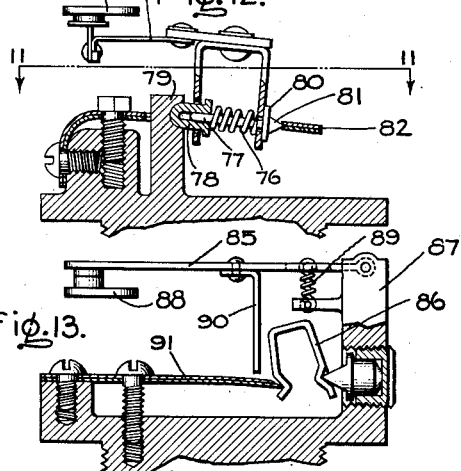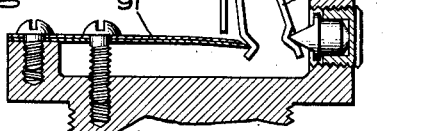

Patented Jan. 7, 1930

1,743,073

UNITED STATES PATENT OFFICE

ALBERT H. SIMMONS, OF WHEATON, ILLINOIS, ASSIGNOR TO EDISON ELECTRIC APPLIANCE COMPANY, INCORPORATED, OF CHICAGO, ILLINOIS, A CORPORATION OF NEW YORK

TEMPERATURE-CONTROL DEVICE

Application filed August 3, 1926. Serial No. 126,869.

My invention relates to temperature control devices and has for its object the provision of a simple, reliable and efficient device of this character.

More specifically my invention relates to means for opening and closing an electric circuit in response to changes in temperature. Ordinarily, the electric circuit to be opened and closed is a heating circuit or a control circuit for a heating circuit, whereby the operation of the temperature control device regulates the generation of heat in such manner as to maintain a predetermined temperature. My invention is an improvement of the temperature control device described and claimed in U. S. patent to Lewerenz No. 1,516,195 dated November 18, 1924.

In carrying out my invention, I provide a bimetallic thermostatic bar having one end fixed and its other end movable laterally upon distortion of the bar due to changes in temperature. The movable end of the bar bears on a pivoted member which preferably carries the switching or other controlling means. In order to give the switching means a snap action in opening and closing the electric circuit an elastic force is applied to the thermostat so as to cause it to move quickly from one position to another.

For a more complete understanding of my invention reference should be had to the accompanying drawing in which Fig. 1 is a fragmentary view showing an electric percolator provided with a temperature control device embodying my invention; Fig. 2 is an enlarged view looking upward of the temperature control device; Figs. 3 and 4 are sectional views taken along the line 3—3 of Fig. 2, looking in the direction of the arrows, showing the control device respectively in closed and opened positions; Fig. 5 is a fragmentary view showing details of construction; Fig. 6 is a diagrammatic view illustrating certain principles of operation of the device; while Figs. 7–13, inclusive, are views showing modifications of my invention, Fig. 11 being a sectional view along the line 11 of Fig. 12 looking in the direction of the arrows, and Fig. 12 being a sectional view along the line 12—12 of Fig. 11 looking in the direction of the arrows.

Referring to Figs. 1–5, inclusive, of the drawing, I have shown my invention in one form as applied to an electric coffee percolator comprising a suitable container 10 in the bottom of which is secured centrally thereof an electric heating unit 11. Enclosing the heating unit is a cap member 12 of a percolator pump of any conventional design from which a tube 13 leads upward, and, as shown, carries on its upper end a ground coffee container 14 provided with a perforated bottom and a perforated cover 14ª. The operation of the percolator pump is well known, and it will be sufficient to say that water from the container 10 enters the cap 12 through a restricted opening 15 at the bottom and after being heated is forced upward by steam pressure through the tube 13 from which the water falls into the ground coffee container 14 and percolates through the ground coffee into the container 10.

The heating unit 11 and the temperature control device are embodied in a unitary structure, the heating unit and various parts being mounted on a support 16 which may be made of cast iron. This support 16 has a threaded cylindrical portion 17 with a flange or head 18 at one end. The threaded portion 17 is inserted from below in an aperture provided for it in the bottom wall of the container 10 so that the flange 18 seats against the outer surface of the bottom in which position the support is secured by means of a nut 19 on the threaded portion 17, the nut being turned down firmly against the inner wall of the container, and suitable gaskets being used to form a water-tight joint. It will be understood that the device as shown in Figs. 3 and 4 is in inverted relation with respect to Fig. 1.

The temperature control device is mounted on the exterior portion of the support 16, that is, on the head 18. It comprises a suitable thermostat, shown as a bimetallic bar 20 made of two strips of metal having dissimilar temperature coefficients of expansion, such as brass and steel, these two strips being securely welded or brazed together lengthwise.

The bar 20 is rigidly secured at one end to the support 16 by means of a clamping screw 21 passing through a suitable hole provided for it in the bar. As shown this fixed end of the bar is bent downward at substantially right angles with the remainder of the bar so that it is clamped by the screw 21 against the rim or edge of the head 18. An adjustment screw 22 is provided near the fixed end. This screw is at right angles to the screw 21 and likewise passes through a hole provided for it in the bar. In order to as nearly as practicable distribute the fibre stresses uniformly in the thermostatic metal and thus reduce the maximum fibre stresses, the fixed end of the thermostatic bar is made considerably wider than the opposite or movable end. Upon distortion of the thermostat, due to changes in temperature, the unsecured end moves laterally.

This movable end of the thermostat bar 20 is provided with a knife-edge pivot bearing 23 which rests in a bearing seat provided for it in one arm of an inverted U shaped resilient member or spring 24. The other arm of the member 24 is seated on a fixed knife-edge bearing 25, the seats for the knife-edge bearings 23 and 25 being provided by striking V shaped indentations in the ends of the two arms of the member 24 as shown in Fig. 5. In order to secure the member 24 against lateral displacement, one of the knife-edge bearings, as shown the bearing 25, is provided with a notch 25$^a$, Fig. 5, in which fits a rib 24$^a$ on the corresponding arm of the member 24. This rib is formed by a portion of the metal in the center of the arm which is left after striking knife-edge bearing seats at each side.

The bearing 25 lies in the plane of movement of the thermostat bar 20 in such position that at a predetermined temperature, the knife-edge bearing 23 on the bar will lie on a line passing through the bearing 25, and the effective point of support of the bar. This position of the thermostat bar will be hereafter referred to as the "neutral" position. Now the head of the adjustment screw 22 engages the upper side of the thermostat bar and holds the bar depressed against the resiliency of the bar so that all distortion of the bar takes place in that portion between the screw and the movable end. Consequently, from the standpoint of distortion, the head of the screw 22 is the point of support of the bar so that the neutral position is defined by a line passing through the knife-edge bearing 25 and the point of engagement between the bar and the head of the screw 22.

One of the functions of the resilient member 24 is that of a spring to apply an elastic force to the movable end of the thermostat bar. The arms of the member 24 tend to separate by reason of the resiliency of the member, they being compressed between the bearings 23 and 25, whereby the member 24 exerts a force on the movable end of the thermostat, which force tends to hold the movable end on one side or the other of the neutral position. In the neutral position, however, the entire force exerted by the member 24 is in the direction of the point of support of the thermostat against the head of the adjustment screw 22, i. e. lengthwise of the thermostat, the lateral component being zero, but when the thermostat moves from the neutral position in either direction, a lateral component of this spring pressure is produced tending to force the thermostat away from the neutral position, this lateral component increasing as the thermostat moves away from the neutral position.

Secured to the base portion of the member 24 is a block 26 of suitable electrically insulating material, such as fibre, and secured in turn to the block 26 is a flexible switch arm 27. As shown, these mechanical connections between the member 24 and the block 26 and between the block and the switch arm 27 are effected by rivets 28. The block 26 electrically insulates the switch arm 27 from the member 24. On its free end, the switch arm carries a bridging contact 29 which cooperates with fixed contacts 30 and 30$^a$. The contacts 30 and 30$^a$ are secured to a supporting bracket 31 in electrically insulated relation with the bracket and with each other, the bracket 31 being secured to the head 18 by means of screws 32 and 33. As shown, the contact 30$^a$ is connected by means of a conductor 34 to one terminal 35 of the electric heater 11, while the contact 30 may be connected by means of the contact 36 to one side of a suitable supply source, to the opposite side of which the remaining terminal 37 of the heater is connected by means of a conductor 38.

It will, therefore, be observed that when the bridging contact 29 is in engagement with the contacts 30 and 30$^a$ so as to electrically connect them, as shown in Fig. 3, the electric circuit for the heater 11 is closed. In order to provide a loose connection between the contact 29 and the switch arm 27, the end of the switch arm is bent upward at an angle and the bridging contact secured to this upwardly turned end by means of a loose rivet 39. This allows the bridging contact to adjust itself so as to engage both fixed contacts. Projections 40 embracing the upwardly turned end of the switch arm are provided on the bridging contact for the purpose of limiting the freedom of movement of the bridging contact to a comparatively small angle such that there is no possibility of its turning on the rivet 39 when in open circuit position to such an extent that it can not move into engagement with the fixed contacts 30 and 30$^a$ when the switch arm is lowered to closed position.

In the operation of the control device the switch arm 27 is held downward by the spring 24 to maintain the heating circuit closed, as shown in Fig. 3, as long as the temperature is below a predetermined maximum temperature. Under this condition of temperature, the movable end of the thermostatic bar is situated below the neutral position previously referred to, that is, a line joining the knife-edge bearing 25 with the point of engagement between the thermostat and the head of the screw 22. As the temperature increases the distortion of the thermostat bar tends to move its free end upward, but this movement is resisted by the resilient member 24. Upon the occurrence of the predetermined maximum temperature, however, the thermostat overcomes the lateral component of the force exerted by the spring member 24 and starts to move upward. As soon as the thermostat starts to move upward, however, it will be observed that the opposing force exerted by the spring 24 begins to decrease in view of the fact that the spring exerts its force more nearly in the direction of the line of support of the thermostat. In other words, the spring 24 decreasingly resists movement of the thermostat and as a result the thermostat rapidly accelerates and moves at high speed through the neutral position to the opposite side thereof, where it is assisted by the increasing lateral component of force applied by the spring member 24. This results in a quick opening of the heating circuit, the bridging contact 29 being thrown upward to the position shown in Fig. 4 so as to disengage the fixed contacts with a snap action. This snap action is further assured by the flexible switch arm 27. In the closed circuit position, as shown in Fig. 3, the contact arm is bent downward somewhat by reason of the fact that the bridging contact 29 engages the fixed contacts somewhat before the thermostatic bar reaches its normal closed circuit position. As a result of this arrangement the bridging contact is held in engagement with the fixed contacts, by reason of the straightening of the contact arm 27, during the initial movement of the thermostat and this initial slow movement is thus absorbed so that the thermostat has an opportunity to accelerate to a high speed by the time the arm 27 has straightened itself and moves the bridging contact away from the fixed contacts.

After the heating circuit has been opened and the temperature of the device, and consequently of the thermostat, begins to decrease, the distortion of the thermostat tends to move it back to the closed circuit position, but its movement is opposed as before by the force exerted by the spring member 24, until such time as the spring member 24 is overcome at some predetermined minimum temperature when the thermostat will snap to close circuit position. The heating circuit is thus controlled so as to maintain a predetermined temperature which is a mean between the maximum and minimum temperatures for which the device is set to operate. During the closing of the circuit the resilient contact arm 27 in bending downward after the engagement of the contacts produces a wiping action between the contacts so that their contacting surfaces are maintained clean. In other words, after the bridging contact 29 touches the fixed contacts 30 and 30ª, it is slid over them to the left as the switch arm is bent downward finally coming to rest in the position shown in Fig. 3.

When the switch arm is in the open circuit position, the member 24 comes to rest against the stop screw 41, as shown in Fig. 4. When the control device is in closed circuit position, however, as indicated in Fig. 3, the thermostat is free to bend downward in response to relatively low temperatures, such as the room temperatures which would prevail, for example, when the heating device is not in use. While downward movement of the thermostat is opposed by the fragile switch arm 27, this opposing action of the switch arm is more than balanced by the force applied by the spring member 24. The thermostat is thus free to take up any position due to distortion at the low temperatures, and consequently there is no danger of permanent distortion of the thermostat due to internal fibre stresses which might be set up if its freedom of distortion were restricted.

By means of the adjustment screw 22, the device can be set to maintain a desired predetermined temperature. To set the device to maintain a higher temperature the screw 22 is turned downward, whereas to decrease this temperature the screw is turned upward. An adjustment for the knife-edge bearing 25 is also provided whereby the range between the maximum and minimum temperatures at which the circuit is opened and closed may be controlled. As shown the knife-edge bearing 25 is formed on the end of a pin 42 which is rotatably seated in a bore provided for it in a screw 43. This screw is secured in an upwardly extending projection 44 on the head 18. By turning the screw 43 so as to move the bearing 25 inward against the spring 24, that is, toward the left, as viewed in Fig. 3, the force exerted by the spring 24 is increased and, therefore, the range is increased between the maximum temperature at which the circuit is opened and the minimum temperature at which the circuit is again closed. Movement of the bearing 25 in the opposite direction decreases this temperature range. It will be understood that the screw 43 is rotatable with respect to the bearing 25 so that this adjustment is made without rotating the bearing 25.

I have found that where provision is made for fairly extensive movements of the thermostat bar in both directions, as in the construction shown, there may be a tendency for the thermostat to move slowly at first until a certain position is reached from which the thermostat snaps quickly through the neutral position. This initial slow movement, which obviously has no effect on the closing of the circuit and cannot affect the quick opening of the circuit by reason of the flexible switch arm 27, may be explained by the fact that as long as the change in temperature is not sufficient to produce a distortion of the thermostat which would cause it to move through the neutral position if the pressure of the spring 24 were removed, the force of the thermostat will decrease to zero before the neutral position is reached and consequently it cannot snap through to the other side of the neutral position. This may be understood by reference to the diagram shown in Fig. 6. Assuming the neutral position along the line $x-y$, suppose that the thermostat is forced by the spring to a position indicated by the full line 45 when, if the spring pressure were removed, the thermostat would take up the position indicated by the dotted line 46 somewhat short of the neutral position $x-y$. Under these conditions, it is obvious that the thermostat cannot snap immediately from the position 45 through the neutral position, since its propelling force due to distortion becomes zero before it reaches the neutral position. It will, therefore, first move slowly to some such position as indicated by the full line 47 where the conditions are such that if the spring pressure were removed it would take up a position on the opposite side of the neutral, such as indicated by the dotted line 48. The propelling force of the thermostat after it starts from the position 47 will be sufficiently to carry it through the neutral position, and it will then be forced still further by the spring pressure over to some such position as indicated by the line 49.

Although any suitable electric heating unit 11 may be used, I have shown a heating unit of the type disclosed in Patent No. 1,367,341 to Abbott dated February 1, 1921. This unit comprises an outer metallic sheath 50, suitably shaped, in which a helical heating resistor 51 is embedded in powdered heat refractory insulating material 52. The heating unit extends through the support 16 which is suitably secured to the sheath, for example, by casting the support around the sheath.

In the modified form of my invention shown in Fig. 7 the U shaped spring member 24 of Figs. 1-4, inclusive, has been replaced by a solid bar 55 which is pivoted in the same manner as the spring 24 on the end of the thermostat and a fixed knife-edge bearing 56. The thermostat 57 in this form, however, is provided with a curved, substantially circular, portion 58 whereby the thermostat itself has resiliency in the direction of its support and, therefore, supplies the spring pressure formerly applied by the spring 24. The modification shown in Fig. 8 differs from that shown in Fig. 7 by the fact that the movable contact 59 is mounted directly on the end of the thermostat.

In Fig. 9 I have shown a helical spring 60 which is secured between the arms of the inverted U shaped member 61. One end of the spring encircles a pin 62 and is seated against a collar 63 secured to the pin. The collar 63 rests again one arm of the member 61, the pin extending through an aperture provided for it in the arm, and being provided with a seat in its end for the knife-edge bearing 64 on the end of the thermostat. The opposite end of the spring 60 rests against the opposite arm of member 61 and is held in place by projections 65 on the arm, these projections being shown as struck out of the metal of the arm. This arm of the member 61 is provided with a knife-edge bearing 66 which rests in a seat provided for it in the end of a fixed pin 67.

Fig. 10 like Fig. 6, shows a solid bar member 70 in place of the U shaped spring member 24 of Figs. 1-4 inclusive. In this form, however, the spring pressure is applied in connection with the fixed knife-edge bearing 71, this bearing being slidably mounted in a bore in a screw 72 so as to be movable in the direction of the point of support of the thermostat. The bearing 71 is forced in the direction of the point of support of the thermostat by means of a helical spring 73 encircling it.

In the form shown in Figs. 11 and 12 a resilient force is applied to the end of the thermostat 75 by means of a helical spring 76 which is secured beside the thermostat and applies a force in a direction away from the fixed end of the thermostat. As shown the spring 76 is mounted on a pin 77, one end of which is slidably secured in a socket member 78 which rests in a depression in an abutment 79. The opposite end of the spring bears against a collar 80 on the pin so as to force the pin toward the right as viewed in Fig. 12. A knife-edge bearing 81 is provided on the pin and this bearing rests in a seat provided for it in a lateral projection 82 on the end of the thermostat. This form has the advantage that it may be placed in a smaller space than the other forms disclosed. It will be noted that in this case the fixed contacts are secured to a support 83 above the switch arm 84 since with this arrangement the switch arm moves upward when moving toward the closed position.

In the modified form shown in Fig. 13 the switch arm 85 is not carried by the spring 86 but instead is pivotally mounted on the support 87. It is normally held down in engagement with the stationary contact 88 by means of a helical spring 89. Secured to the switch arm is a rod or bar 90 which extends downward with its end terminating opposite the end of the thermostat 91. With the thermostat in the closed circuit position, as shown in the drawing, the end of the member 90 is spaced somewhat from the thermostat. Upon an increase in temperature the thermostat snaps through the neutral position, as will be understood from the previous description, and at some predetermined point of its movement strikes the end of the member 90, lifting the switch arm 85 out of engagement with the contact 88. This form of my invention makes it possible to use a heavier construction of the contact arm and other switch parts so that the switch may be adapted for heavier currents. It will be observed that a very abrupt separation of the contacts is obtained, since the thermostat accelerates to a high speed before engaging the member 90.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new, and desire to secure by Letters Patent of the United States, is:

1. A temperature control device comprising a thermostat, means for causing said thermostat to move quickly from one position to another, and flexible control means associated with said thermostat, said control means being arranged to flex to permit free distortion of said thermostat upon excessive temperature changes.

2. A temperature control device comprising a thermostat, means for causing said thermostat to move quickly from one position to another, and a flexible control member actuated by said thermostat, said control member being arranged to flex to permit free distortion of said thermostat upon excessive temperature changes.

3. A temperature control device comprising a support, a bimetallic thermostat bar having one end secured to said support and its other end movable laterally upon distortion of said bar due to changes in temperature, a spring bearing on the movable end of said thermostat so as to cause said bar to move quickly from one position to another, and a flexible control member operated by said thermostat, said control member being arranged to flex to permit free distortion of said thermostat upon excessive temperature changes.

4. A temperature control device comprising a bimetallic thermostat bar having one end fixed and its other end movable in response to changes in temperature, a spring bearing on the movable end of said thermostat so as to cause said bar to move quickly, from one position to another, and a flexible control member operated by said thermostat, said control member being arranged to flex to permit free distortion of said thermostat upon excessive temperature changes.

5. A temperature control device comprising a thermostat bar, an elastic member acting on said bar so as to tend to move the bar in one or the other of two directions depending on the position of the bar, and a flexible switch arm carried by said elastic member.

6. A temperature control device comprising a thermostat, a U shaped spring member having one arm bearing on a fixed pivot and its other arm bearing on said thermostat so as to cause said thermostat to move quickly from one position to another, and a switch arm secured to the central portion of said spring member.

7. A temperature control device comprising a bimetallic thermostat bar, a U shaped spring member having one arm bearing on a fixed pivot and the other arm bearing on the movable end of said bar, and a contact arm secured at one end to the central portion of said spring member.

8. A temperature control device comprising a bimetallic thermostat bar having one end movable laterally in response to changes in temperature, a U shaped spring member having one of its arms pivoted on the end of said bar, a fixed pivot for the other arm of said member, and a flexible contact arm carried by said U shaped member in insulated relation therewith.

9. A temperature control device comprising a bimetallic thermostat bar, resilient means engaging said bar so as to resist movement of said bar from either one of two extreme positions up to an intermediate neutral position and then to assist further movement of said bar to the other extreme position, a switch arm arranged to open an electric circuit when the bar moves to one extreme position and to close said circuit when said bar moves to the other extreme position, said switch arm being arranged to flex after closing said circuit upon further movement of said bar to its corresponding extreme position whereby upon movement of said bar to the opposite extreme position said circuit is maintained closed by said switch arm until said thermostat has accelerated to a high speed.

10. A temperature control device comprising a support, a bimetallic thermostat bar having one end secured to said support, a fixed pivot bearing adjacent the movable end of said bar, a resilient member bearing on said fixed pivot and the movable end of said bar, a U shaped member carried by said resilient member, and a resilient contact arm carried by said U shaped member.

11. A temperature control device comprising a support, a bimetallic thermostat bar having one end secured to said support and its other end movable in response to changes in temperature, a fixed pivot, a bearing member having one end pivoted on the movable end of said bar and its other end pivoted on said fixed pivot, elastic means for applying a force to the movable end of said bar so as to tend to move the bar in one or the other of two directions, and a contact arm carried by said bearing member.

12. A temperature control device comprising a quick-acting bimetallic thermostat bar, means for retarding the initial movement of said bar from one position to another, a control device, and an operating connection between said thermostat bar and said control device arranged to absorb said initial slow movement after which said control device is operated.

13. The combination with a quick-acting bimetallic thermostat bar, means for retarding the initial movement of said bar from one position to another, a switch, and a connection between said thermostat bar and said switch arranged to absorb said initial slow movement after which said switch is operated.

14. A temperature control device comprising a thermostat, means for causing the thermostat to snap quickly from one position to another after going through an initial slow movement, a flexible contact arm operated by said thermostat, and a stationary contact with which said contact arm engages when said thermostat is in one of its positions, said contact arm being arranged to flex when moved by said thermostat into engagement with said stationary contact whereby said contact arm is maintained in engagement with said stationary contact during the initial slow return movement of said thermostat.

In witness whereof, I have hereunto set my hand this 30th day of July, 1926.

ALBERT H. SIMMONS.